(12) United States Patent
Tuttle

(10) Patent No.: US 7,075,421 B1
(45) Date of Patent: Jul. 11, 2006

(54) TIRE TEMPERATURE AND PRESSURE MONITORING SENSORS AND SYSTEMS

(76) Inventor: John R. Tuttle, 4084 Eleuthera Ct., Boulder, CO (US) 80301

( * ) Notice: Subject to any disclaimer, the term of this patent is extended or adjusted under 35 U.S.C. 154(b) by 381 days.

(21) Appl. No.: 10/621,774

(22) Filed: Jul. 17, 2003

Related U.S. Application Data

(60) Provisional application No. 60/397,175, filed on Jul. 19, 2002.

(51) Int. Cl.
- *B60C 23/00* (2006.01)
- *B60C 23/02* (2006.01)
- *B60C 19/00* (2006.01)
- *B60C 19/08* (2006.01)
- *B60Q 1/00* (2006.01)

(52) U.S. Cl. ............ 340/449; 340/442; 340/445; 340/447; 340/448; 152/152.1; 73/146.2; 73/146.3; 73/146.4; 73/146.5; 73/146.6; 73/146.7; 73/146.8

(58) Field of Classification Search ........ 340/442–449; 73/146.1–146.8; 152/152.1
See application file for complete search history.

(56) References Cited

U.S. PATENT DOCUMENTS

| | | | | | |
|---|---|---|---|---|---|
| 3,881,170 | A | * | 4/1975 | Hosaka et al. | 340/448 |
| 4,235,184 | A | * | 11/1980 | Schiavone | 116/34 R |
| 5,452,608 | A | * | 9/1995 | Green | 73/146.8 |
| 5,513,525 | A | * | 5/1996 | Schurmann | 73/146.5 |
| 6,255,940 | B1 | * | 7/2001 | Phelan et al. | 340/447 |
| 6,292,095 | B1 | * | 9/2001 | Fuller et al. | 340/442 |
| 6,549,125 | B1 | * | 4/2003 | Nigon et al. | 340/447 |

* cited by examiner

*Primary Examiner*—Jeffery Hofsass
*Assistant Examiner*—Lam Pham
(74) *Attorney, Agent, or Firm*—Rick Martin; Patent Law Offices of Rick Martin, P.C.

(57) ABSTRACT

A tire monitoring system providing tire status and notifying or warning the vehicle operator of early detection of imminent tire failure and performance degradation; thus improving safety by preventing blowouts from occurring, lengthening tire life by encouraging preventive maintenance, and improving fuel mileage by encouraging the operator to fill the tire to its proper pressure or repair it. The system monitors temperature of the rim of the wheel to which the tire is attached, such temperature being transmitted to the vehicle operator or other interested parties via means such as radio frequency.

6 Claims, 8 Drawing Sheets

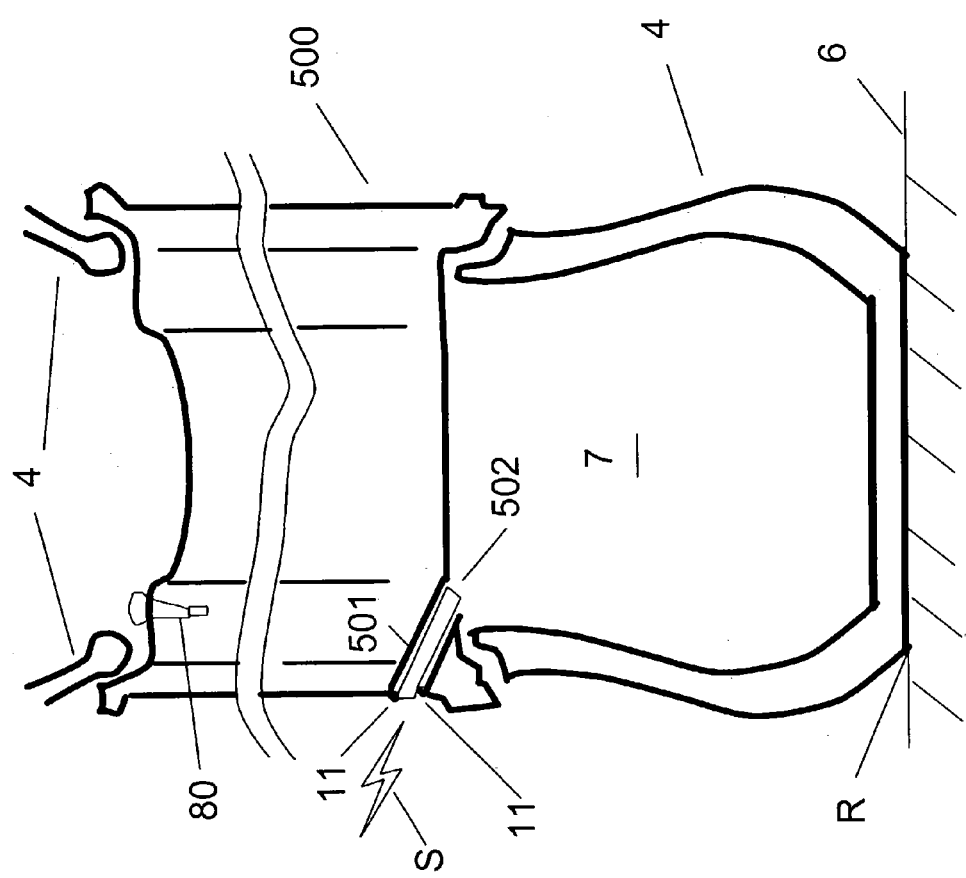

TIRE TEMPERATURE AND PRESSURE MONITORING SENSORS AND SYSTEMS

CROSS REFERENCE APPLICATIONS

This application is a non-provisional application claiming the benefits of provisional application No. 60/397,175 filed Jul. 19, 2002.

FIELD OF THE INVENTION

The present invention relates to vehicle tire safety, extending tire life, and reducing vehicle fuel cost. More particularly, the invention relates to monitoring the temperature of the wheel rim and/or tire air temperature and/or pressure as a primary parameter. The invention is directed particularly, but not solely, toward providing notification of deviations from normal tire performance, so that remedial action can be taken before tire failure or degradation occurs or before further operational losses occur.

BACKGROUND OF THE INVENTION

There are many parties who would benefit from early detection and warning of degradation of tire performance or of imminent failure of a tire. For example, in passenger car tires, off-road tires, in truck or bus radial tires, the consumer, those in industry and government are all interested in improving safety and operational efficiency of vehicles with tires.

Some interesting statistics have been found through various industry studies (Cycloid National Tire Survey, for example) to show various aspects of tire data. For example:

1. Almost 25% of the total truck and trailer tire inventory experiences problems each year. Over 80% of all tire problems experienced by fleets are a direct result of improper inflation.
2. A 10-degree drop in air temperature will reduce tire pressure by 1 psi. The difference between summer and winter tire pressures can be as much as 8 psi, causing a fuel penalty.
3. For truck tires, a 10 psi drop in tire pressure will increase tire rolling resistance by 2%, resulting in loss of fuel economy and increase in operating temperature.
4. Tires under-inflated by 15% will cause fuel penalties of about 2.5%; 30% under-inflation will increase fuel consumption by about 5%.
5. Tire costs are the second highest operating cost after fuel. Driver costs have fallen to third in operating expenses.
6. An industry average of 20% of the annual maintenance budget is spent on tires and tire management programs.
7. Running tires at 20–30% under-inflation can reduce tire life by up to 50%, cause increased tire running temperatures, lead to premature tire removal, and also reduce the life of the casing, which affects the ability to retread.
8. Surveys indicate that consistent proper tire inflation for the trucking industry could increase fleet wear by 17%.
9. A 100 psi tire run under-inflated at 80 psi will lose 15–20% of its life, and damage its further life as a retread candidate.
10. Tire abuse causes rubber debris on the road. Almost all debris comes from dual tires, primarily from the inner tire.
11. An under-inflated condition, which weakens the sidewall cables, causes failure.
12. The average cost for an emergency roadside assistance call is about $775.00.
13. Retreads use 7 gallons of oil to re-manufacture a tire versus 22 gallons for a new tire.
14. Proper tire inflation could save 25,000 lives each year.

These studies show the importance of good tire management and the impact on cost, safety, and environment. Tire failures have produced some terrible consequences in terms of the loss of life and property. Failure of the user to maintain the tires is an important factor. Air pressure may not always be considered to be a continuous maintenance process by the operators of vehicles. Thus, operating tires with low air pressures often does not manifest itself immediately, but rather, over a period of time.

Truck tires operate with greater load pressures and sidewall stress than a normal automobile tire. The temperature of the tire created by the friction of running up and down the highway is also much higher in a truck. All of these factors add to the importance to practice regular tire maintenance for both original rubber tires and recap tires. Both are susceptible to the same factors, and their lives will be a reflection of the maintenance they receive. In vehicles with high daily mileage, tire pressure must be checked on a daily basis considering the risks involved in picking up a nail, bolt, wire, suffering a sidewall cut, etc. Caps should be kept on the valve stems. Front axle or steering tires are usually considered to be the most important of the 18 tires on a large rig. A radial tire cannot safely be run if low on air pressure, particularly on the steering axle. With greater loads bearing upon the tires, higher speeds create higher operating temperatures, making regular maintenance of tires (including balancing and alignment) more critical than ever.

Many prior art patents focus on measurement of tire pressure, indicating that tire pressure is perceived as an important parameter to measure. Those in the transportation industry are aware that their vehicles do indeed get better fuel mileage and longer wear if tires are properly inflated. In some cases, temperature of the air inside the tire or temperature of the tire and tread are also measured because laws of physics relate pressure and temperature. Charles Law (V/T=constant), states that gas expands by the same fraction with each degree that it's temperature rises. Thus, the ratio of volume (V) to temperature (T) does not change if the pressure remains constant. Boyle's Law (PV=constant) states that the product of pressure (P) multiplied by volume (V) remains constant if there is no change in temperature or if the number of particles in a container remains constant.

The universal gas law "PV=nRT" combines the aforementioned Boyle's and Charle's law with Avogadro's law (which states that an equal volume of all gases have the same amount of particles given the same pressure and temperature). In this law P is the gas pressure, V is the volume, n is the number of moles of gas, R is the universal gas constant with a value of 8.314 joules per Kelvin per mole and T is its absolute temperature. This universal gas law states that temperature can, for example, be doubled in three ways; (1) Gas volume can be doubled from its original volume, (2) The pressure of gas can be doubled, (3) The amount of moles of gas can be halved. It can also be easily seen that a loss of air molecules can result in an increase in temperature or loss of pressure. With no air molecule loss, as temperature rises inside a tire, the pressure may also rise, thus "low" pressure is not always an indication of tire health.

Thus, knowing both temperature and pressure of a gas in a fixed vessel, such as a tire, allows one to normalize the pressure at a standard temperature such as 20 degc. This would yield a meaningful and normalized pressure measurement, having been corrected by air temperature.

It is well understood by tire manufacturers that the actual main failure mechanism in radial tires is the separation (delaminating) of the inner liner from the inner wall of the tire due "directly" to high temperature, not to low pressure. Thus, and for other reasons noted herein, it can be simpler, more effective, cheaper and more reliable to measure temperature instead of pressure-only or pressure-corrected-by-temperature. If a tire maintains normal temperature in operation, then the tire is not facing imminent self-destruction or excessive wear, and is not consuming extra fuel; at least not to any greater extent than would be inferred by monitoring pressure inside the tire air chamber.

Many companies recognize the value of monitoring tire temperature. For example, Goodyear® provides a "Temperature Prediction Model" that uses peak tire temperature—a major factor in tire failures—instead of the traditional kilometer-per-hour/ton-mile-per-hour formula to select and manage tires in service. The model provides a forecast of temperature at the hot spot of the tires, based on a myriad of variables to maximize tire life by knowing when the tires are entering the heat danger zone and taking steps to keep them out of that zone by putting the vehicle on a different route, performing maintenance, or some other activity. It anticipates the impact of route configuration, ambient temperature, expected weather forecast, route description, timing, distance and speed among other variables in actual tire model temperature and pressure prediction.

Onboard microcomputers, attached to the interior of a tire, to monitor various parameters (temperature, pressure and load) is the goal of many tire companies. A system to reduce downtime, extend tire life, eliminate field checks, increase safety and save money is the goal.

Most manufacturers' systems operate on basically the same level. Monitoring chips are located inside the air chambers of the tire and monitor operating parameters. That information is then transferred to an onboard receiver mounted somewhere on the vehicle and/or is sent to monitors in the fleet office.

The theory behind tire chip technology would be to provide operators with a display to see, on a real-time basis, which tires are getting hot, and adjust routes to avoid excessive heat which is the tire's worst enemy.

Some companies have a system that is slightly different in that there is no onboard receiver. The vehicles must pass through a fixed gate reader where the tire chips are scanned, and the information is then transferred to the fleet office.

Whereas nothing needs to be done with the tire if all monitored parameters are satisfactory. If there is a problem with a tire, a computer is alerted to what the problem is—be it low pressure, high temperatures, etc. such that the customer can fix the problem before it cascades into something much larger and more expensive.

External monitoring would show indications at various levels; (1) Potential problems that may arise, (2) Problems requiring some action, and (3) Emergency situations requiring stopping the vehicle and having it serviced immediately.

One problem with a technology located within a tire is that it has to withstand a lot of punishment. Moving earth out of a quarry with a 240-ton truck, an 18-wheel rig with a heavy load, or other road conditions submit a computer chip to a great deal of stress. A monitoring technology must also last anywhere from two to five years with no maintenance. System failures, where the sensor is inside a tire, would require the tire to be removed and, thus, be costly.

Many manufactures are concentrating on monitoring of tire pressure, believing that a substantial number of tire problems, equipment downtime and excessive tire wear are due to under inflation. Thus, their goal is to place a gauge inside a tire and monitor a vehicle's tire pressure. As previously stated, tire pressure is not a sole determinant in finding problems. As aforementioned in universal gas law ($PV=nRT$) it can be easily seen that if the temperature increases, for example doubles, then the pressure would double. Thus, if a tire started to lose air molecules, causing it to deflate, temperature would get hotter. The higher temperature could result in pressure increasing and may not reveal that there is a problem if monitoring pressure alone.

Irrespective of avoiding catastrophic failure due to liner separation, the fuel inefficiencies and increased tire wear due to low-pressure cause heat to be generated in the tire. Thus, measurement of tire temperature can provide early detection of catastrophic failure in addition to improved operational efficiencies because the degradation mechanism is the same; namely, increased road friction from the larger "footprint" due to the tire shape flattening as a result of being underfilled while under load. It is also important to note that detecting low pressure will not identify impending tire failure, whereas detecting tire temperature will identify impending tire failure, even if measured through the rim.

Measuring tire temperature itself is problematic in that tires flex, raising engineering hurdles such as "how to attach a sensor to a flexing object?" It is also difficult technologically to send the pressure or temperature data from a device within the tire cavity.

Users of tire monitoring systems would strongly prefer that the mounting and maintenance of a tire monitoring system not require removing the tire from the rim either for installation or maintenance of the monitoring system, over the life of the tire, which can be years.

Thus, it is desirable to place the sensor on the rim inside the tire cavity or outside the tire cavity, instead of in, or on, the tire itself. An alternative location is in a hole in the rim that communicates to the inside of the tire air chamber. If a sensor is on the tire, tires are periodically replaced, implying that the sensor must be discarded with the old tire or recovered for placement in the new tire.

The present invention solves the aforementioned problems by providing the benefit of a sensor mountable to the exterior of the rim where it is easy to maintain. For example, if sensor batteries need to be changed, then they are accessible on the outside of the tire rim.

SUMMARY OF THE INVENTION

The main aspect of the present invention is to provide a system of monitoring and assessment of operational temperature status of all operational tires on a vehicle.

Another aspect of the present invention is to provide for parametric measurement of temperature and/or pressure parameter of each tire within a tire system.

Another aspect of the present invention is to provide for measurement of the parameter of tire heat by monitoring the temperature at the rim of the tire wheel.

Another aspect of the present invention is to provide for an on-board system and display subsystem to collect, store, send, and/or display parameters of each tire within a vehicle.

Another aspect of the present invention is to provide for a real-time data acquisition, alarm, and display system to the operator and/or external monitoring station.

Another aspect of the present invention is to provide for parametric comparisons of data between tires or groups of tires within a vehicle or groups of vehicles.

Still another aspect of the present invention is to provide for optional telecommunications to an external monitoring system for use in retrieval, analysis, manipulation, and/or other actions as required.

Another aspect of the present invention is to have an individual tire monitoring sensor (TMS) be easily mounted for initial installation, maintenance or replacement.

Another aspect of the present invention is to have the individual TMS be mounted to the rim of a tire.

Another aspect of the present invention is to provide a means for improving operational safety, economy and maintenance.

Another aspect of the present invention is to allow for compensation of measured parameters due to other effects such as braking, external temperature, road conditions, etc.

Another aspect of the present invention, an alternate embodiment, is to have the individual TMS be mounted in a hole within the tire rim to monitor the inner pneumatic chamber of the tire.

Other aspects of this invention will appear from the following description and appended claims, reference being made to the accompanying drawings forming a part of this specification wherein like reference characters designate corresponding parts in the several views.

The operational temperature of the vehicle tire affects the temperature of a tire rim. Other factors such as braking action, outside temperature and other road conditions also affect the temperature at the tire rim. Because heat is coupled to the tire itself, the temperature resulting from a combination of sources is a relevant temperature to monitor in order to prevent degradation, wear, and failure. Further, since multiple rims can be monitored at once, group rim temperature performance and individual comparison may lead to benefits in brake adjustment when certain brakes are generating more heat than others. Fine differences in braking effectiveness will allow improved brake adjustment accuracy and methods.

The present invention makes use of the fact that the tire rim temperature is a pertinent parameter to monitor. It is easily accessible and allows ease of sensor application and maintenance.

DETAILED DESCRIPTION OF INVENTION

The following description describes the present invention when implemented in a vehicle environment. This is an example of one implementation of the present invention, and is not intended to limit the application of the present invention. The present invention can be applied to all vehicles and/or equipment with tires mounted to rims including but not limited to 18-wheel rigs, earth moving vehicles, heavy duty trucks, light duty trucks, automobiles, motorcycles, ATV's, robotic equipment, etc. The invention may be implemented in a number of other industries and environments. It will be apparent from the disclosure of the present invention that the invention may be used in environments including, but not limited to, transportation terminals or stations, The present invention provides a system of monitoring operational status and assessment of all tires within a vehicle when the vehicle is in motion by monitoring parameters that have meaning when tires are in motion.

The present invention utilizes the principle that thermal conductivity varies among different materials. The thermal conductivity of metal wheel rims is high when compared to that of air and other thermal insulators such as tire rubber. The increased area of road contact of the under-inflated tire causes an increase in friction as the vehicle moves, causing an increase in temperature in the tire tread, causing the air inside the tire to heat up, which then raises the temperature of the tire rim. The rim, being a good conductor of heat, will then have approximately the same temperature on the outside as it has on the inside. Thus, when the vehicle is in motion, the high rim temperature correlates inversely with tire health. The temperature of a single tire can also be related and compared to that of other tires on the same vehicle or to a similar class of tires under similar conditions of vehicle speed and external ambient temperature. The present invention provides for tire temperature data to be collected and distributed in a form suitable to alert an operator and to allow effective data mining for purposes such as forming groups or classes of tires with their respective historical performances. The present invention allows system-specific applications to be downloaded into user's communication devices, whether fixed or mobile.

As previously mentioned prior art focus is on measuring pressure, strain or deformation of the tire. The present invention uses the fact that all tire problems of interest generate heat when the tire is in motion; and heat can be measured by a device attached to the tire rim instead of to the tire itself or to the valve stem.

The preferred embodiment of the present invention uses a TMS placed on the outer side of a tire rim to monitor and transmit the tire metal wheel rim temperature. With present technology the packaging of a TMS can easily fit, for example, into the form factor or space of a tire weight. The TMS can be attached in much the same manner as a tire weight that is used in tire balancing or can be mounted by other means such as a weld, bonding, etc. Mounting in such a manner is relatively simple and cost effective. Maintenance with any TMS would not require tire removal and be relatively accessible. An alternate embodiment would be to mount the TMS on the internal part of the rim, although it would not be as accessible.

Each TMS would contain a temperature sensor device (such as a thermocouple), a signal-conditioning unit (SCU), a processor unit with memory, a transmitter (and optionally a receiver), battery, and an antenna. An optional receiver would allow the TMS to receive commands, perform mundane functions such as turn power on/off (batter saver), transmit status on command, change the sample rate, etc. The SCU would function to filter unwanted frequencies, amplify the signal, convert, and otherwise prepare it for further processing. Each TMS would also contain a unique manufacturing number identification to be used with the on-board data processing unit (OBDPU) in identifying each unique TMS to a particular tire on the vehicle.

The entire tire monitoring alarm system (TMAS) of the present invention provides for each individual TMS to relay data, including its identity, to an on-board data processing unit (OBDPU). TMS location and respective identity would be inputted during an initial TMS setup program and stored within the OBDPU memory for subsequent processing of TMS signals, which contain unique TMS identity. The OBDPU would communicate to a display subsystem to display parameters of each tire within a vehicle. The OBDPU would also contain a data processing unit (DPU) with memory to collect and store each tire data. The DPU would also contain software to analyze and compare individual tire data to groups of tire data. For example, if one TMS is sending data that is significantly different from other TMS data, action may be required. The OBDPU would send various alarm levels to the vehicle operator (owner, manager or remote system) in the case of finding a trend, warning or emergency condition. Crossing predetermined data thresholds contained within the TMS device, TMAS, or remote monitoring system may generate alarms. The TMS may interface with other systems besides the TMAS, such as remote systems, or other devices, either on-board or remotely located. TMAS data may be transmitted and received in both directions, enabling system adjustments to be made based on transmissions or receptions. Each TMS would contain a temperature sensor, a SCU, a data signal processing unit (DSPU), a transmitter (optional receiver), antenna and battery. The TMS unit can be provided with only a transmitter or, optionally, with both a transmitter and receiver. The DSPU could accept external command from the OBDPU to perform certain functions. An example of such functions, but not limited to, are to transmit at a certain time delay basis, turn off, or send a particular tire temperature when requested, etc.

Optionally, the TMAS OBDPU can be provided to contain telecommunications to allow on-board collected data to be, sent to a remote monitoring system via a modem or other telecommunications device and also be able to receive information and/or commands from a remote system. The remote system would be able to retrieve, store, analyze, manipulate and/or take action as required. For example, the remote system may perform analysis on the vehicle data and compare it to other vehicle data. The resulting analysis could be sent back to the vehicle operator for recommended, or required, action such as a maintenance stop or route change.

The TMAS of the present invention provides a means for improving operational safety, economy and maintenance. By monitoring the temperature at the tire rim the TMAS will allow for compensation of measured parameters due to other effects such as braking, external temperature, road conditions, etc. The TMAS will provide timely feedback, which will result in on-time maintenance and lower operational costs. Problems found on a real-time basis will result in optimized use of fuel as related to tire problems, optimum tire wear and replacement, increased operator safety, and increased safety to others.

As mentioned above, compensation for temperature data from the rim for various temperature effects on the rim, such as temperature increases generated by applying the brakes for long periods, external temperature etc. can be performed. Removing such extraneous effects provides a more accurate assessment of the temperature component emanating from tire heat itself. As aforementioned, excess temperatures caused from braking may also be used to adjust brakes for even braking and or replace individual brakes as required.

An alternate embodiment of the present invention is to have the individual TMS be mounted in a hole within the tire rim to monitor the inner pneumatic chamber of the tire. As such each individual TMS could monitor internal tire temperature and/or pressure via a hole in the rim that accesses the inner pneumatic chamber of the tire, said hole being sealed by the TMS device acquiring the data, and said TMS transmitting data to the TMAS.

In the preferred embodiment of the present invention the TMAS would inform the operator, owner, manager, and/or remote system of the status of a vehicle's tires by data acquisition. The TMAS would provide information to the operator by visual indication and have an option to supply remote date transmission. Information would be provided on an individual tire; a group of tires, or comparisons of tire temperatures from other vehicles or stored data. Thus, each TMAS provides for improved tire safety by measuring temperature of the moving vehicle's tire rim, performing on board analysis, sending alarms to the operator as required, and optionally communicating same to a remote data collection point(s).

The monitoring, analysis, and feedback of tire health provides improved tire maintenance, leading to better fuel mileage and longer wear, both of which contribute to reduced costs of operation for individual, commercial and government vehicles.

BRIEF DESCRIPTION OF THE DRAWINGS

FIG. 8 is a cross sectional front view of an alternate embodiment TMS which is mounted through a hole in the rim.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
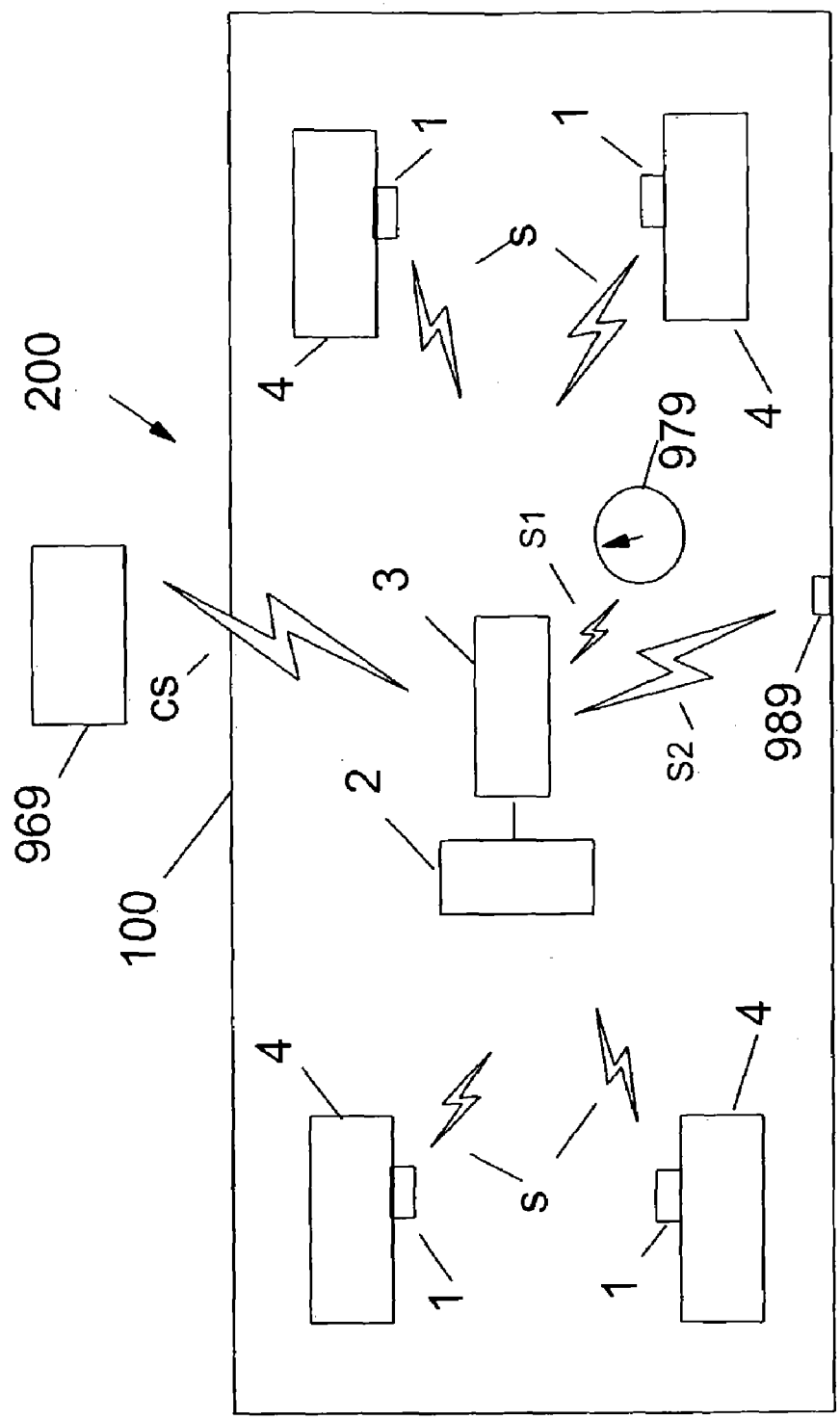
FIG. 1 is a top view illustration a TMAS on a vehicle with four tires, each tire having a TMS, a vehicle OBDPU and display.

FIG. 1 is a top view illustration of a tire monitoring alarm system TMAS 200 on vehicle 100, which has four tires, each tire 4 having a TMS 1 mounted externally to each tire rim. The rims are not numbered. On Board Data Processing Unit OBDPU 3 and display subsystem (DSS) 2 is also shown. OBDPU 3 receives signal S from each TMS 1. The signal S contains tire rim temperature readings. OBDPU 3 can also be supplied with a transmitter/receiver to optionally communicate externally via a modem (or other communications device) to external control/monitor stations 969 via external signal CS. It should be noted that although TMS 1 in the preferred embodiment of the present invention contains only a transmitter, optionally a transmitter/receiver in each TMS 1 is an alternate embodiment. Likewise the preferred embodiment of the present invention teaches a TMAS 200 with only on-board communications via signal S. An alternate embodiment can contain OBDPU 3 with a transmitter/receiver for communication with an external control/monitor station 969. It should be noted that although a 4-tire vehicle is depicted in FIG. 1, the same concept applies to vehicles with more (or fewer) tires. The present invention uses the fact that all tire problems of interest generate heat when each tire 4 is in motion, and heat can be measured by TMS 1 attached to each tire 4 at each tire rim instead of to the tire itself or to the valve stem. Each TMS 1 would contain a temperature sensor device (such as a thermocouple), a signal-conditioning unit (SCU), a processor unit, memory, a transmitter (and optionally a receiver), battery, and an antenna. The SCU would function to filter unwanted frequencies, amplify the signal, convert, and otherwise prepare it for further processing. Each TMS 1 would also contain a unique manufacturing identity that would be included with each transmission sent to the OBDPU.

An optional aforementioned receiver in TMS 1 would allow TMS 1 to receive commands from OBDPU 3 and perform mundane functions such as power on/off (batter saver), transmit status on command, etc. Each TMS 1 is shown mounted on the inner rim side although they could as easily be mounted on the outer rim side. The OBDPU3 can receive vehicle speed data from the speedometer 979 via signal S1. An optional ambient temperature sensor 989 can also send data to the OBDPU3 via signal S2.

Figure 2:
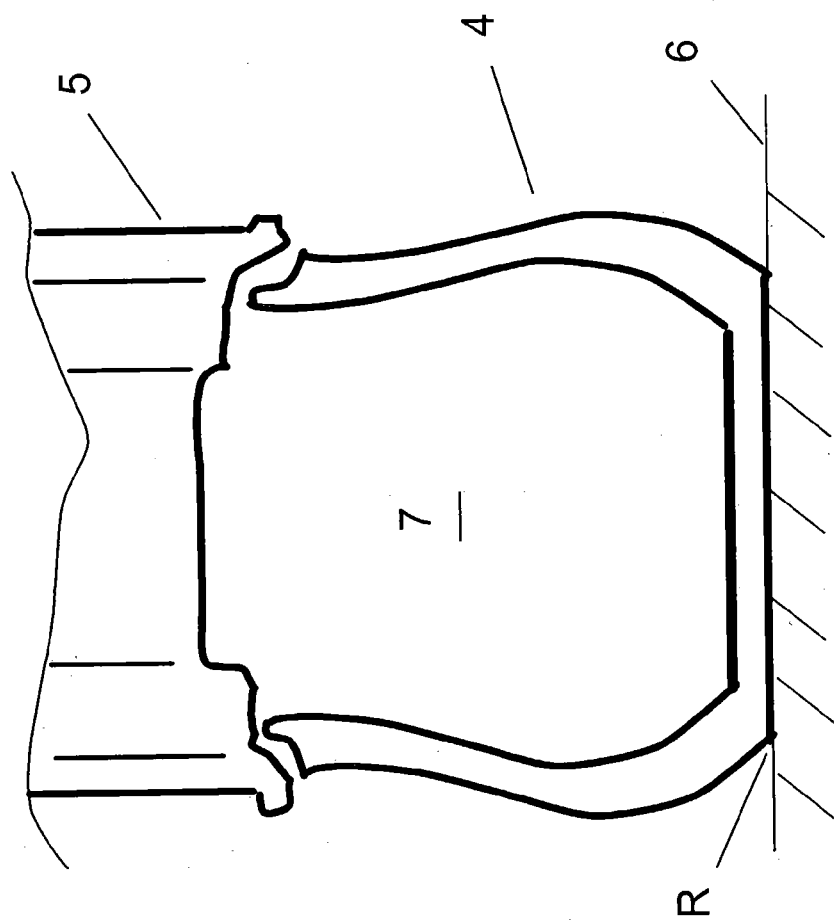
FIG. 2 is a prior art cross-sectional front view of a metal wheel rim and tire on a road surface.

FIG. 2 is a cross-sectional front view of metal wheel rim 5 and tire 4 on road surface 6. The present invention utilizes the principle that thermal conductivity varies among different materials. The thermal conductivity of metal wheel rim 5 is high when compared to that of air 7 and other thermal insulators such as the rubber of tire 4. The increased area of road contact R of an under-inflated tire 4 causes an increase in friction as the vehicle moves, causing an increase in temperature in the tire tread, causing the air 7 inside the tire to heat up, which then raises the temperature of tire rim 5. Tire rim 5, being a good conductor of heat, will then have virtually the same temperature on its outside surface as it has on its inside surface. Thus, when the vehicle is in motion, the high rim temperature correlates inversely with tire health.

Figure 3:
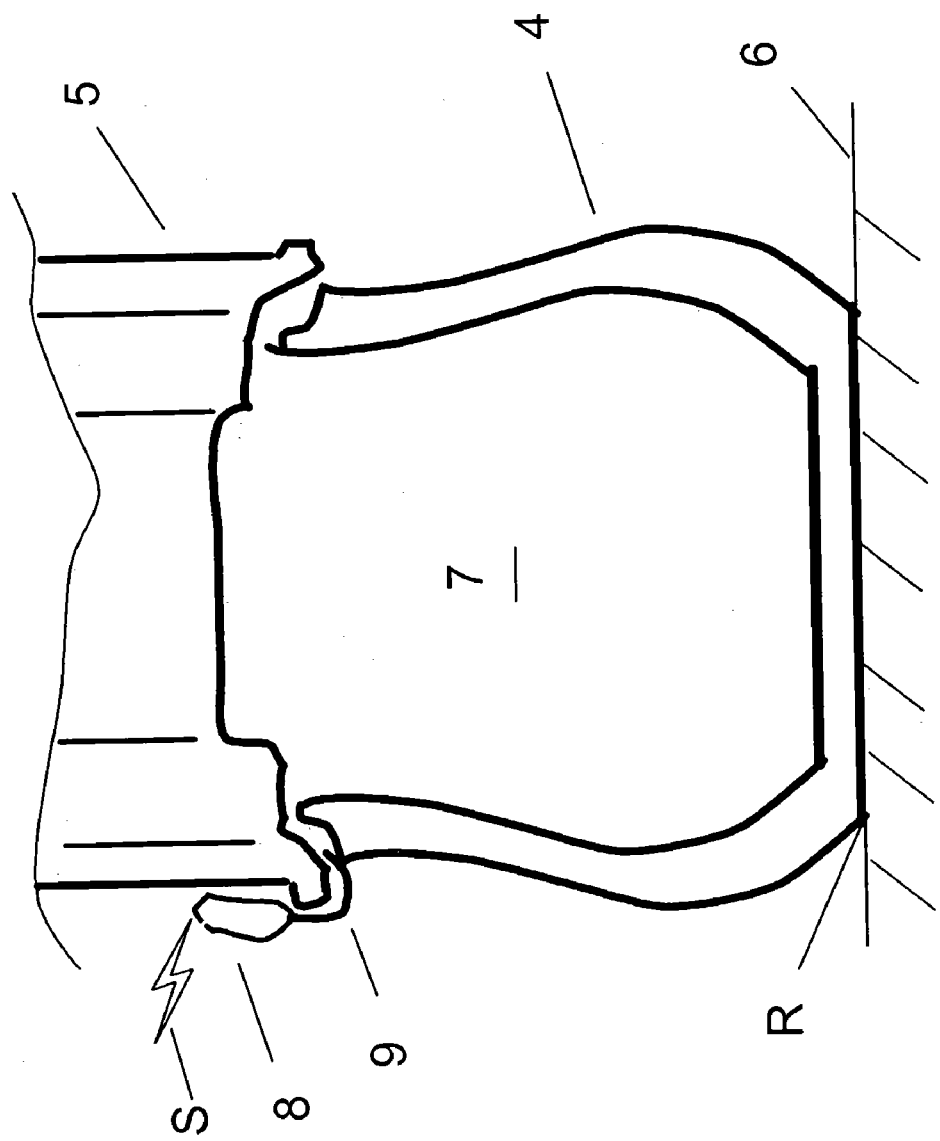
FIG. 3 is a cross-sectional front view of a metal wheel rim, tire and TMS clip type rim mount, the preferred embodiment of the present invention.

FIG. 3 is a cross-sectional front view of a metal wheel rim 5, tire 4, and wheel weight format TMS 8, clip type rim mount 9. FIG. 3 is the preferred embodiment of the present invention. Wheel weight format TMS 8 is placed on metal wheel rim 5 to monitor temperature of the rim 5. With present technology, packaging of wheel weight format TMS 8 can easily fit, as shown, into the form factor or space of a tire weight with clip type rim mount 9. Wheel weight format TMS 8 is shown attached in much the same manner as a tire weight that is used in tire balancing. The temperature of metal wheel rim 5 of a single tire 4 can be related and compared to that of other tires on the same vehicle, to a similar class of tires under similar conditions of vehicle speed and external ambient temperature, or to a history of the speed/temperature log of that tire. As previously mentioned, the increased area of road contact R with road surface 6 of an under-inflated tire 4 causes an increase in friction as the vehicle moves, causing an increase in temperature in the tire tread, causing the air 7 inside the tire to heat up, which then raises the temperature of tire rim 5. TMS 1 would transmit temperature data via signal S. As previously mentioned, TMS 1 can optionally contain a receiver to perform mundane functions such as power on/off (batter saver), transmit status on command, etc.

Figure 4:
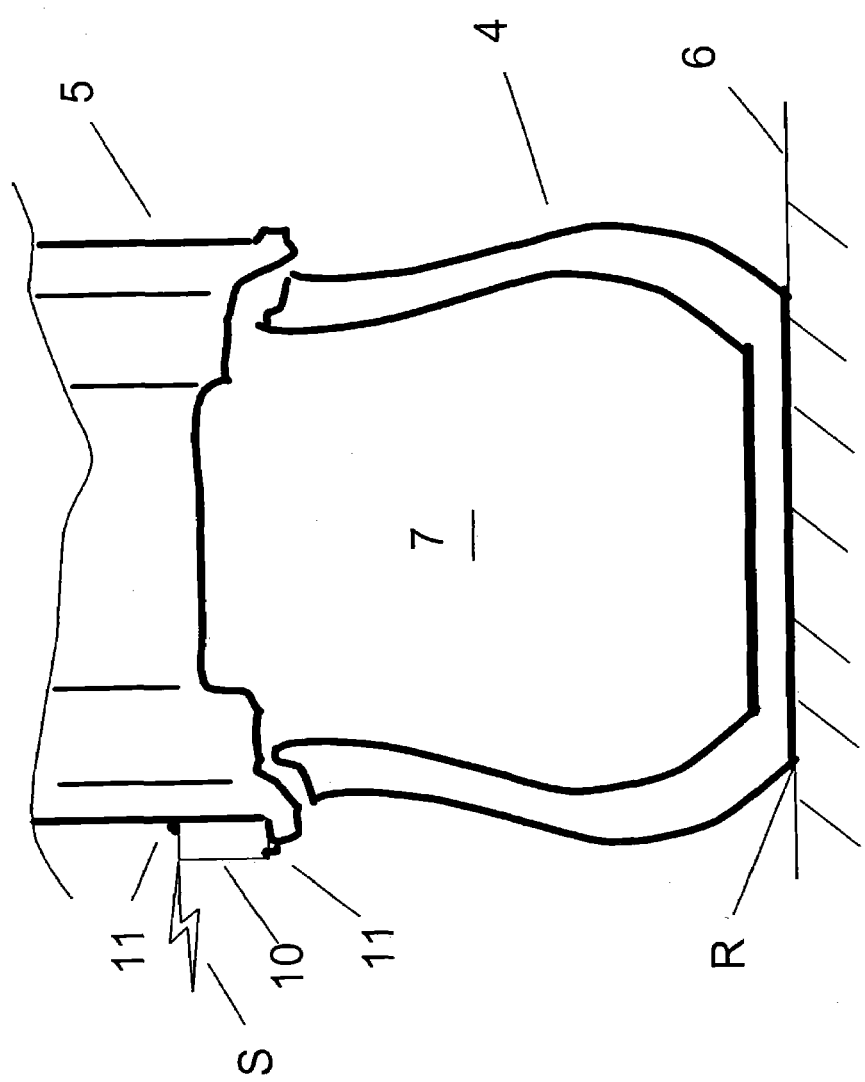
FIG. 4 is a cross-sectional front view of a metal wheel rim, tire and a weld or bond rim mount TMS, an alternate embodiment of the present invention.

FIG. 4 is a cross-sectional front view of a metal wheel rim 5, tire 4 and weld (or bond) rim mount TMS 10, an alternate embodiment of the present invention. FIG. 4 is similar to FIG. 3 with the exception of weld (or bond) rim mount TMS 10. A weld (or bond) 11 would hold weld rim mount TMS 10 into place on metal wheel rim 5 as it transmits temperature data via signal S. A replaceable battery can be changed without removing the tire from the rim.

Figure 5:
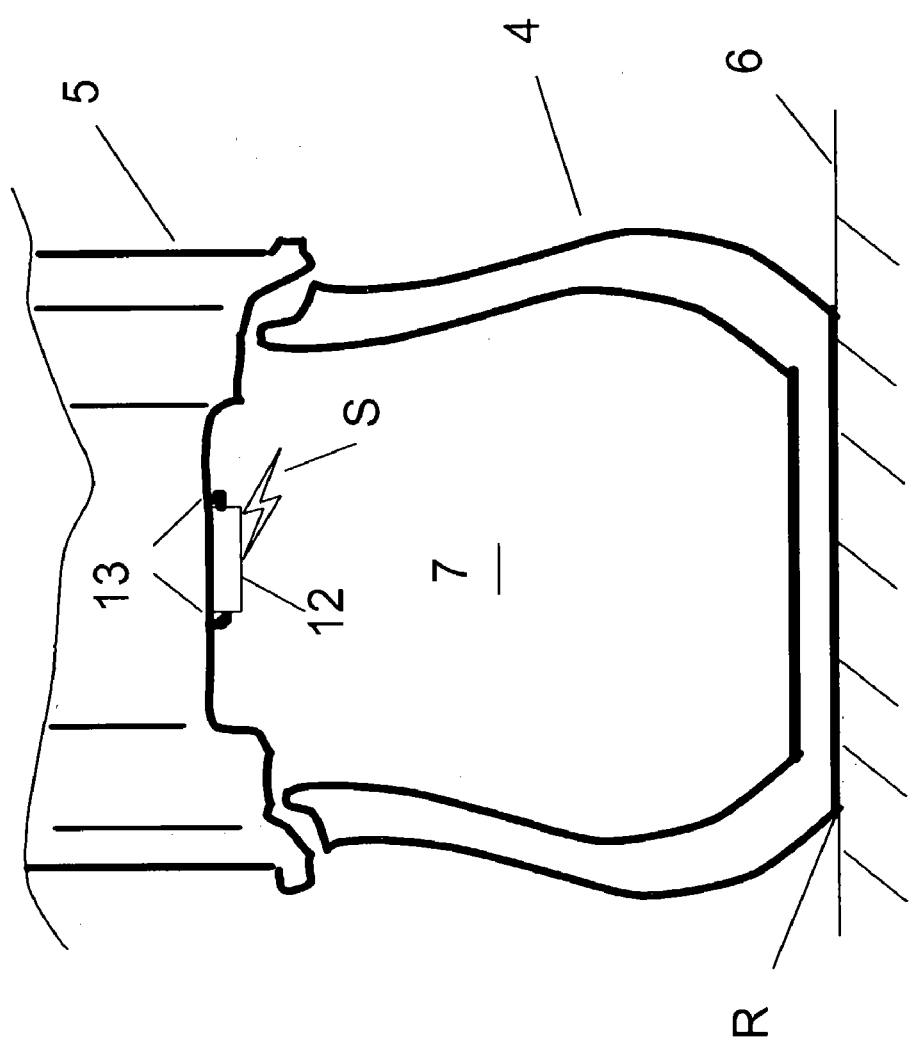
FIG. 5 is a cross-sectional front view of a metal wheel rim, tire and internal TMS weld or bond rim mount, an alternate embodiment of the present invention.

FIG. 5 is a cross-sectional front view of a metal wheel rim 5, tire 4 and internal TMS 12 with weld (or bond) 13 for internal rim mounting, an alternate embodiment of the present invention. In this alternate embodiment, internal TMS 12 is attached to the inner rim 5 section as shown. Internal TMS 12 would monitor and send metal wheel rim 5 temperature data via signal S. Optionally, in this alternate embodiment, TMS 12 could also monitor and send temperature data of air 7. This alternate embodiment has the advantage of being safer from theft than previously depicted embodiments but has one major disadvantage of having to have the tire removed for any required maintenance. It also has a permanent type mount versus a clip mount of the preferred embodiment.

Figure 6:
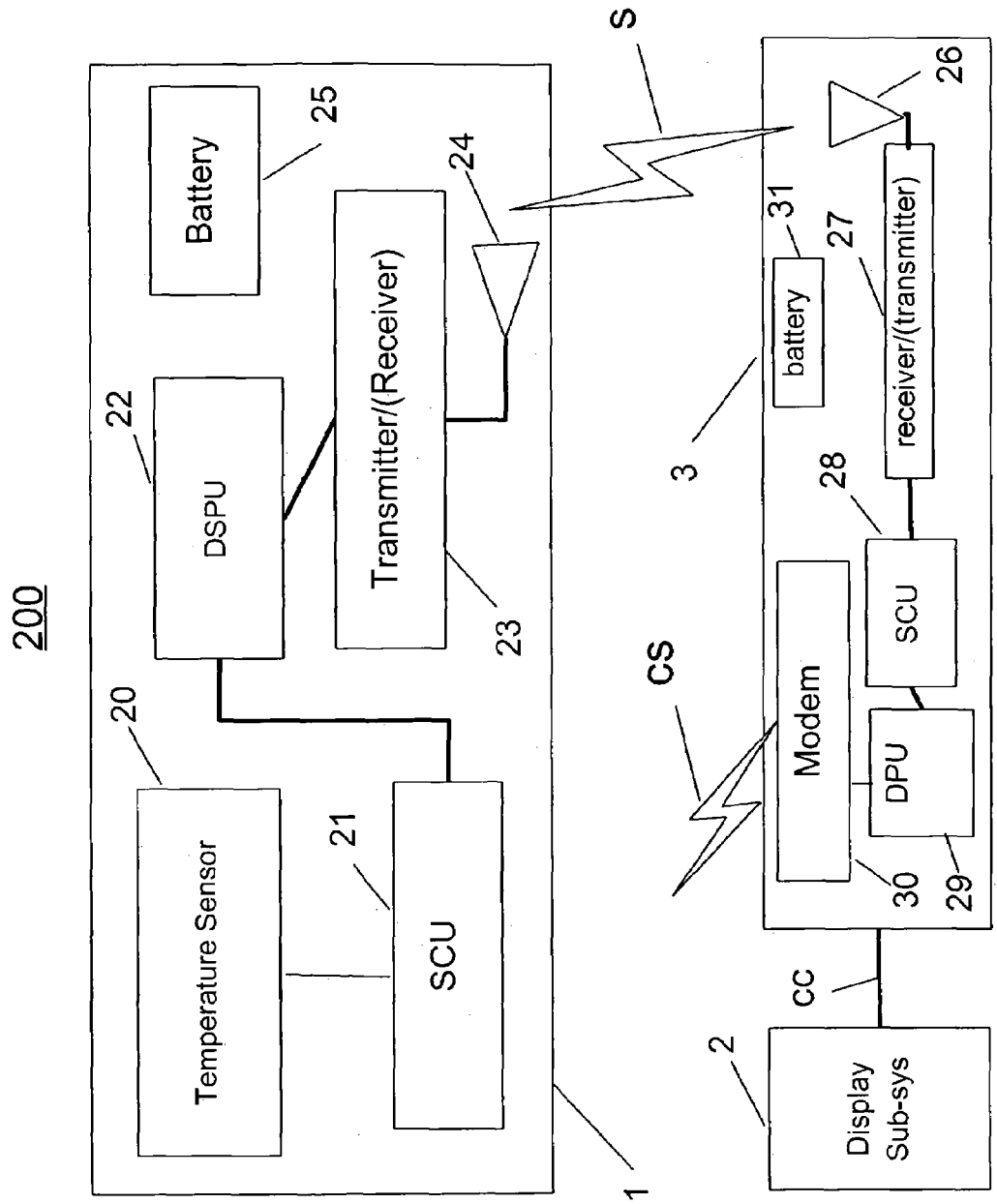
FIG. 6 is a schematic representation of the entire TMAS showing the TMS, OBDPU and display unit.

FIG. 6 is a schematic representation of the entire TMAS 200 showing the TMS 1, OBDPU 3 and DSS 2. TMS 1 is placed on the tire rim (see FIGS. 3, 4, 5) to monitor and transmit the metal wheel rim temperature via signal S to OPDPU 3. TMS 1 can be attached in much the same manner as a tire weight that is used in tire balancing or can be mounted by other means such as a weld, bonding, etc. Each tire would have a TMS 1. Each TMS 1 would contain a temperature sensor 20 (such as a thermocouple), Signal Conditioning Unit (SCU) 21, a data signal processor unit (DSPU) 22 with memory, a transmitter 23 (and optionally a receiver), battery 25, and antenna 24. SCU 21 would function to filter unwanted frequencies, amplify the signal, convert, and otherwise prepare it for further processing. An optional receiver in TMS 1 would allow TMS 1 to also receive commands from OBDPU 3 in order to perform mundane functions such as, but not limited to, power on/off (batter saver), transmit status on command, transmit at a certain time delay basis, or send a particular tire temperature when requested, etc. TMAS 200 of the present invention provides for each individual TMS 1 to relay data to OBDPU 3 and/or to a remote processor.

OBDPU 3 contains antenna 26 for communication with TMS 1, receiver 27 (which can optionally also be a transmitter), SCU 28, data processing unit (DPU) 29 with internal memory to collect and store each tire data, and modem 30 (an option for external communications). SCU 28 would function to filter unwanted frequencies, amplify the signal, convert, and otherwise prepare it for further processing. Battery 31 can be an individual battery or an adapter to the vehicle battery for powering OBDPU 3 and subsystem DSS 2.

Data Processing Unit (DPU) 29 would contain software to analyze and compare individual tire data to groups of tire data. For example, if one TMS 1 is sending temperature data (and its unique identity) that is significantly higher than other TMS 1 data, action would be required. OBDPU 3 would send various alarm levels to DSS 2 or concurrently, with an optional modem 30, OBDPU 3 could send data to a remote system via external signal CS. Thus, various warning or alarm conditions would be displayed to the operator and could be sent to an external system in the cases of finding a trend, warning or emergency condition. Crossing predetermined data thresholds contained within TMS device 1, OBDPU 3, or remote monitoring system may generate alarms. TMS 1 may also interface with other systems besides TMAS 200, such as remote systems, or other devices, either on-board or remotely located. TMAS 200 internal system data may be received (and optionally transmitted) with TMS 1 in both directions, enabling system adjustments to be made based on transmissions or receptions. OBDPU 3 would communicate to DSS 2 via cable CC to display parameters, send alarms, etc. It should be noted that cable CC could be replaced with other forms of communication links such as infrared.

With an option previously discussed, OBDPU 3 can be provided to contain two-way telecommunications to allow on-board collected data to be sent to a remote monitoring system via modem 30 (or other telecommunication devices) and also be able to receive information and/or commands from a remote system via signal CS. The remote system would be able to retrieve, store, analyze, manipulate and/or take action as required. For example, the remote system may perform analysis on the vehicle data and compare it to other vehicle data. The resulting analysis could be sent back to the vehicle operator for recommended, or required, action. Another embodiment is to just eliminate the on board data processor so that the vehicle only downloads data to a remote computer either at a roadside rest stop or via the modem and cellular phone or radio signal to a network computer.

Figure 7:
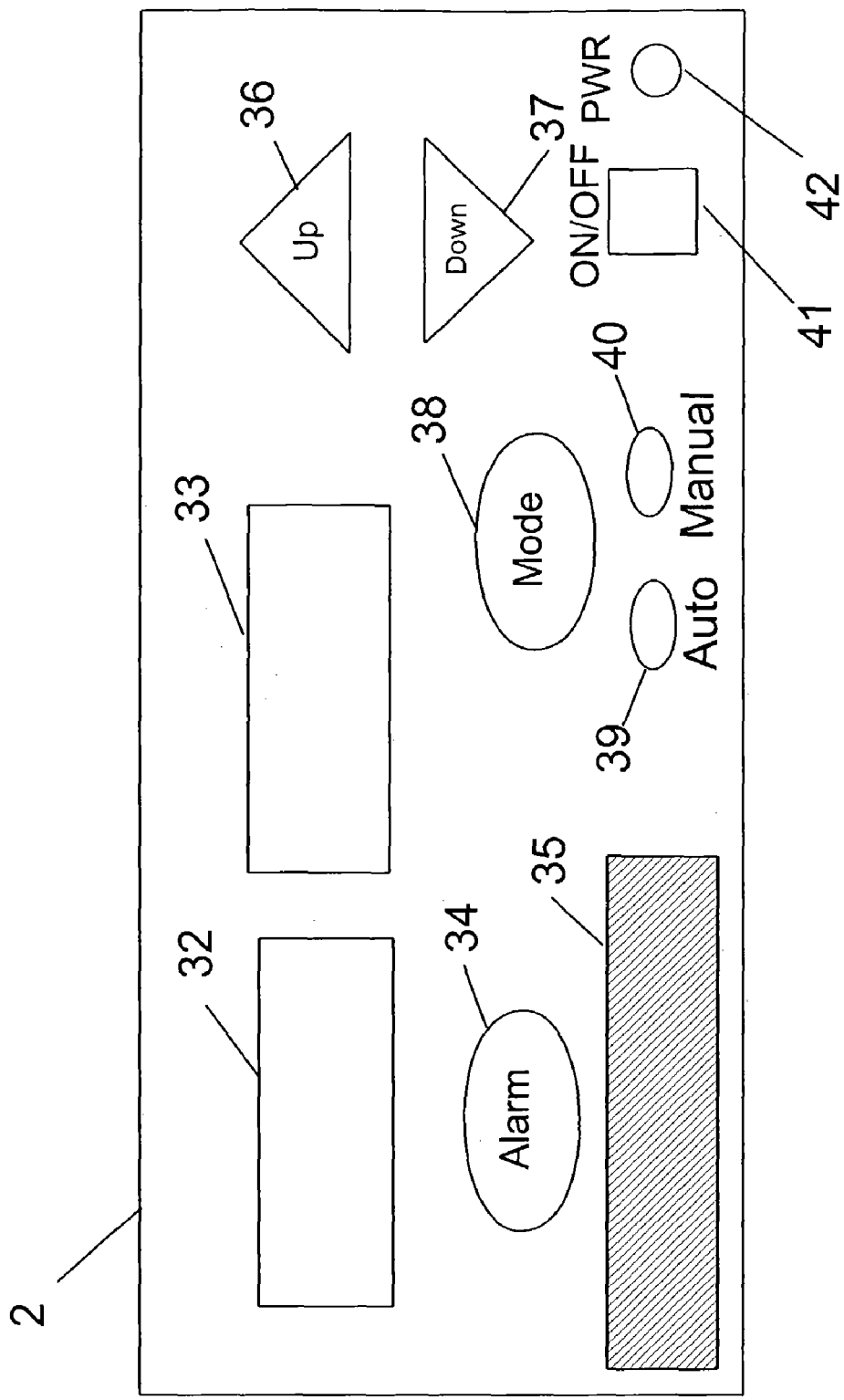
FIG. 7 is an illustrative representation of one type of display.

FIG. 7 is an illustrative representation of but one possible configuration of DSS 2 and, as such, the present invention is not limited to the exact configuration or function of display sub-system shown.

Refer to FIGS. 6 and 7, in the configuration shown DSS 2 has a system power on/off switch 41 for activating DSS 2 and FIG. 6 OBCPU 3. LED indicator 42 would light up when power is activated. With the aforementioned option of TMS 1 having a receiver and OBCPU 3 having a transmitter, OBCPU 3 could activate TMS 1 with a simple command as part of the power up sequence. DSS 2 is depicted with a temperature display window 32, a mode display window 33, up toggle 36, down toggle 37, alarm visual indicator 34, alarm speaker 35, mode button 38, auto LED indicator 39, and manual LED indicator 40.

Pushing mode button 38 would allow the operator to sequence (via multiple inputting) through and select one of several manual modes or sequence to an auto mode. Several examples of various manual modes are as follows:

1. Manual Tire Select Mode—at a particular sequence manual mode button 38 would allow the vehicle operator to place the system in manual tire select mode. Manual LED indicator 40 lit, mode display window 33 indicating "Tire xx temp", temperature display window 32 displaying the actual tire temperature for the selected tire, and to use up toggle 36 and/or down toggle 37 to manually sequence to a different tire. Thus, the operator can read the tire selected in the mode display window 33 and its temperature in temperature display window 32.
2. Maximum temperature differential—at another sequence of manual mode button 38, the operator would select a tire differential reading mode. In this mode, window 33 would display "delta temp" and the highest to lowest tire temperature variation would be indicated in temperature display window 32.
3. Program Mode—during installation and setup of an individual TMS, a particular sequence of manual mode button 38 would enter a "program" mode (displayed on display window 33). In this "program" mode antenna 26 of OBDPU 3 would be desensitized to accept signals emanating from near-in distances (for example, under approximately 12 inches or so). The TMS would be then placed within this distance and the up 36 or down 37 buttons entered to select the installation location that the particular TMS on the vehicle. Another entry of mode button 38 would activate OBDPU 3 to accept a "setup" TMS program signal that would include its unique internal I.D. The respective tire location would be also read from DSS 2 by OBDPU 3. Thus, with the setup complete, the OBDPU would know the tire location when it receives a TMS signal, said signal containing the TMS I.D. along with tire temperature data. It should be noted that other methods of TMS setup are possible.
4. a) Calibration mode-drive vehicle at various steady speeds e.g. 3–5 minutes at 40, 45, 50, 55, 60, 65, 70, 75, 80, 85.
   b) Alternative method to create alarm set-point—History calculus computation of entire temperature running log of vehicle, thus creating an auto-calibration.
   c) Manual calibration mode—Manually enters data from tire specification.
   d) Manual calibration mode—Set deviation parameters such as impermissible rate of temperature change, for alarm.

Other modes can be selected as required by the user, designer, etc. For example mode window 33 could contain system messages from OBCPU 3 (when in auto mode). Auto mode can be programmed to automatically sequence through tire temperatures and display selected tire in the sequence in mode display window 33 and its temperature in temperature display window 32. Alarm visual indicator 34 would display the color "green" if no problems, "yellow" if a warning is indicated and "red" if immediate action needed to be taken. Alarm speaker 35 would also signal an audio alert in the case of a "red" alarm.

Other options for a display format for DSS 2 would be use of a flat panel touch display, a laptop PC, pocket PC, or other similar devices. Tire temperatures could also be displayed as an icon showing each tire with a tire color representing tire condition. For example, "green" indicating a satisfactory condition, "yellow" a warning condition, and "red" a take action condition.

TMAS 200 of the present invention provides a means for improving operational safety, economy and maintenance. By monitoring the temperature at the tire rim TMAS 200 will allow for compensation of measured parameters due to other effects such as braking, external temperature, road conditions, etc. Timely feedback by use of TMAS 200 will result in immediate operator feedback, on-time maintenance and lower operational costs. Problems found on a real-time basis will result in optimized use of fuel as related to tire problems, optimum tire wear and replacement, increased operator safety, and increased safety to others. Optional external communications to a central collection point will add to data analysis and feedback.

EXAMPLE

9AM—Flat tire-No detection or leak
9:30—55 mph-bad tire, hot rim or hot air temperature in tire, alarm computed as:
a) high limit i.e. 400° F.
b) relative among tires
c) relative to ambient-each tire
d) relative at speed with history log
e) relative rate of temperature change
f) relative to stored speed/temperature log FIG. 8 shows the valve stem 80 in the rim 500. The rim 500 has a hole 501 into which TMS 502 is mounted. TMS 502 can sense rim temperature and/or air 7 temperature and/or pressure.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A tire rim temperature sensor comprising:
    a wheel weight format housing having a rim temperature sensor therein;
    a clip on the housing suited for mounting on a wheel rim; and
    the sensor including a transmitter to send a temperature signal remotely.

2. The sensor of claim 1 further comprising a battery.

3. The sensor of claim 2, wherein the battery can be replaced without a removal of a tire affixed to the rim.

4. The sensor of claim 3 further comprising a signal conditioning unit, a processor unit, a memory and an antenna.

5. The sensor of claim 4 further comprising a receiver.

6. The sensor of claim 4, wherein the memory further comprises a unit identifying code.

* * * * *